3,139,825
METHOD FOR PREVENTING SILICON DIOXIDE CONTAMINATION OF LITHOGRAPHIC PRINTING MASTERS

Lewis T. Connolly and Paul F. Swift, Rochester, N.Y., assignors to Eastman Kodak Company, Rochester, N.Y., a corporation of New Jersey
No Drawing. Filed Apr. 5, 1962, Ser. No. 185,220
5 Claims. (Cl. 101—149.2)

This invention relates to a lithographic printing process and, more particularly, to a process for overcoming chemical contamination by silicon dioxide of lithographic printing masters having gelatin images thereon.

In the lithographic printing art, colloidal suspensions of silicon dioxide are commonly utilized. For example, silicon dioxide is used as a component in lithographic plate etches, lithographic plate preservatives and other plate-treating solutions. The silicon dioxide imparts hydrophilicity to such treated surfaces, and it is used to prevent non-image areas from accepting ink. Silicon dioxide tends to build up in the water system of lithographic presses and to generally contaminate the rollers.

A widely used method for preparing lithographic printing plates is to transfer an unhardened gelatin image to a hydrophilic receiving sheet. The gelatin image is thereafter hardened to render a gelatin image oleophilic or receptive to lithographic ink. However, small amounts of silicon dioxide such as referred to above, and which commonly contaminate lithographic printing presses, cause blinding of the gelatin image on the printing master. The silicon dioxide tends to make the gelatin image more hydrophilic and have less ink receptivity than is desired for printing. Conventional gelatin hardening materials utilized in the present art, while serving to harden the gelatin image, have been found to be unsuitable for preventing silicon dioxide blinding.

It is accordingly an object of this invention to provide a novel process for preventing silicon dioxide blinding of lithographic printing masters containing gelatin images. It is also an object of this invention to provide a novel process for treating lithographic printing masters having gelatin images whereby the gelatin is both hardened and made more ink-receptive in the presence of small amounts of silicon dioxide.

These and other objects of the invention are accomplished by treating a gelatin image on a lithographic printing master with an aqueous solution comprising a water-soluble condensation product of resorcinol and 2-furaldehyde.

The condensation product utilized in the present process can be readily prepared by condensing the resorcinol and the 2-furaldehyde at room temperature. The condensations are more generally carried out with about .2 to .6 mole of 2-furaldehyde for each mole of resorcinol, about .4 mole of 2-furaldehyde for each mole of resorcinol producing a particularly useful condensation product.

We prefer to utilize catalytic amounts of such alkaline materials as alkaline metal hydroxides and the like in the condensation reaction. Condensation reactions effected with acidic catalysts such as sulfuric acid tend to be contaminated with tarry residues and are thus not desirably employed.

The present condensation product is dissolved in water to form an aqueous solution. Generally, concentrations of about 5% to about 60% by weight based on the resorcinol moiety in the condensation product comprises the aqueous printing master treating solutions of the invention. The aqueous printing master treating solutions of the invention are then adjusted to a pH of approximately 7. Such substantially neutral media tend to be more stable and further polymerization of the subject condensation product to water insoluble polymers is inhibited.

In a preferred embodiment of the invention, the condensation of the resorcinol and 2-furaldehyde are effected under alkaline conditions as described above. The alkaline material is thereafter neutralized to a pH of 7 with an alkali metal bisulfite such as sodium or potassium bisulfite. The alkali metal bisulfite also serves to associate with unreacted 2-furaledhyde in the reaction mixture to form an addition product thereof. The formation of this addition product further lends stability to the subject solutions by inhibiting further polymerization.

Aqueous printing master treating solutions of the invention which contain the described condensation product can thereafter be utilized for swabbing gelatin images on lithographic masters and/or they can be utilized in fountain solutions on lithographic printing presses. Such solutions serve to harden or tan the gelatin image and render it substantially less sensitive to contamination or blinding by silicon dioxide. Gelatin images treated in accordance with the invention have high ink receptivity and long press life, even in the presence of substantial silicon dioxide contamination. If desired, the gelatin image on the lithographic printing master can be hardened or tanned by conventional or other tanning agents and the solution of the invention utilized in conjunction therewith to prevent silicon dioxide blinding on the image.

Lithographic printing masters having gelatin images can be prepared in a wide variety of methods, although we prefer to utilize photomechanical methods such as are described in Clark et al., U. S. Patent 2,763,553 issued September 18, 1956, Lake et al., U.S. Patent 2,794,388 issued June 4, 1957, and the like. In general, such photomechanical processes for preparing lithographic printing masters containing gelatin images are formed by exposing and developing an unhardened gelatino-silver halide emulsion layer on a support and transferring the unexposed and undeveloped unhardened gelatin portion of the emulsion layer to a receiving sheet coated with an absorbent hydrophilic material which will readily repel greasy printing inks when wet with water. Illustrative hydrophilic surface coating materials for the receiving sheet include fibrous cellulosic surfaces such as present on wood, paper and cloth; grained zinc, anodized aluminum, surfaces of hydrophilic organic colloid such as surface hydrolyzed cellulose ester e.g. a surface hydrolyzed cellulose acetate sheet, surface hydrolyzed synthetic resins such as surface hydrolyzed polyvinyl acetate, polyvinyl alcohol, etc. The resulting gelatin image on the receiving sheet (which serves as a printing master) can then be treated with the aqueous compositions of the invention to tan or harden the gelatin and render it nonsusceptible to silicon dioxide blinding, as well as more oleophilic or ink-receptive.

We have tested a wide variety of condensation products of various polyhydric alcohols and aldehydes, but none of such condensation products were found to be as useful as the condensation products of the invention prepared from resorcinol and 2-furaledhyde for preventing silicon dioxide blinding of lithographic printing masters.

The invention is further illustrated by the following examples of preferred embodiments thereof.

*Example 1*

A 100 g. portion of resorcinol was dissolved in 50 ml. of water. The resulting solution was then cooled to room temperature (about 20° C.) and 30 ml. of 2-furaldehyde added. Thereafter 6 ml. of 48% sodium hydroxide solution were added and the mixture allowed to stand for 16 hours. This solution was then diluted with 3 parts of water and thereafter 5% by weight of diethyl thiourea added. Sufficient sodium bisulfite was then added to bring the pH of the solution to 7.0. The solution was then incubated at 170° F. for 12 hours. The resulting clear aqueous solution was utilized as a swab treatment solution or in a fountain solution for treating a lithographic printing plate containing a gelatin image thereon. The lithographic printing plate was prepared by exposing a photographic element comprising a paper support having coated thereon a photographic unhardened gelatino-silver chloride emulsion containing the tanning developing agent, 4-phenyl catechol. The resulting photographic element was then exposed by reflex exposure to an image, and the exposed photographic element was thereafter immersed for about 10 seconds in a 3% aqueous sodium carbonate bath at 82° F. to develop the image. Then the absorbent hydrophilic surface of a baryta-coated receiving paper was pressed in contact with the developed emulsion and thereafter peeled off, a positive unhardened gelatino-silver image being transferred to the receiving paper. The resulting receiving paper was swabbed for about 30 seconds with the prepared solution of the invention described above and inserted in a Multilith press. The Multilith press was purposely contaminated by utilizing in the fountain solution 0.3% silicon dioxide, as well as a typical repellant composition such as described in Example 1 of Van Dusen, U.S. Patent No. 2,393,875, issued January 29, 1946. The silicon dioxide in the system did not blind the gelatin image on the printing plate. Similar results were obtained when the aqueous printing master treating solution containing the condensation product of the invention prepared as described above was utilized in the fountain solution. However, a printing run on the Multilith press with a printing plate prepared as described above, except that treatment with the aqueous printing master treating solution of the invention as described above was replaced by treatment with a tannic acid hardener as described in Example 2 of Lake et al. U.S. 2,794,388, which resulted in a substantially complete blinding or loss of ink receptivity in the gelatin image areas due to silicon dioxide.

*Example 2*

A lithographic master treating solution was prepared by reacting for about 16 hours at room temperature 33.6 g. of resorcinol and 16.8 ml. of water containing 2 ml. of 48% sodium hydroxide with 10 ml. of 2-furaldehyde. The resulting mixture was diluted with water to contain 10% by weight of the condensation product of resorcinol and 2-furaldehyde based on the resorcinol, and then sufficient sodium bisulfite was added to adjust the pH of the solution to 7.0. The resulting solution was effective for preventing silicon dioxide blinding of the gelatin image of the lithographic printing master when utilized on a multilith printing press as described in Example 1.

*Example 3*

For purposes of comparison, several condensation products closely related to the present resorcinol and 2-furaldehyde condensation products were prepared and tested for their effectiveness in preventing silicon dioxide blinding of gelatin images on lithographic printing masters. Several hydroxy benzene compounds and aldehydes were substituted for the resorcinol and the 2-furaldehyde reactants in the same proportions and reacted under the same conditions as described in Example 1. Lithographic printing masters containing gelatin images prepared as described in Example 1 were swabbed with the various solutions and their evaluation with respect to preventing silicon dioxide blinding when used on a Multilith press were observed.

| Hydroxy benzene compound: | Aldehyde |
|---|---|
| Resorcinol | Aldol. |
| Do | Formaldehyde. |
| Do | Chloroacetaldehyde. |
| Do | Vanillin. |
| Do | Benzaldehyde. |
| Do | p-Hydroxy benzaldehyde. |
| Do | Resorcylaldehyde. |
| Phenol | Formaldehyde. |
| Hydroquinone | Aldol (no reaction). |
| Catechol | Aldol. |
| Pyrogallol | Do. |
| Phenol | Do. |
| Phenol sulfonic acid | Formaldehyde. |

While many of the condensation products described in the above table served as hardeners for the gelatin image, they were substantially inferior to the resorcinol and 2-furaldehyde condensation product of the invention with respect to effectiveness in preventing blinding when small amounts of silicon dioxide were present in the printing system. In addition, some of the condensation products described above had poor stability, formed scums on the printing master or were not adequately soluble in water for effective use.

Thus, the present invention provides a new and useful process for treating lithographic printing masters, and particularly, lithographic printing masters utilized on lithographic printing presses contaminated with small amounts of silicon dioxide.

The compound, 2-furaldehyde, referred to herein is also commonly called "furfural" and "furfuraldehyde."

The invention has been described in considerable detail with particular reference to preferred embodiments thereof, but it will be understood that variations and modifications can be effected within the scope and spirit of the invention as described hereinabove and as defined in the appended claims.

We claim:

1. A process for treating a lithographic printing master having superposed thereon a gelatin printing image which comprises treating said gelatin image with an aqueous solution containing a water-soluble condensation product of resorcinol and 2-furaldehyde.

2. The process for treating an unhardened gelatin image on a lithographic printing master which comprises treating said unhardened gelatin with an aqueous solution containing a water-soluble condensation product of resorcinol and 2-furaldehyde wherein the 2-furaldehyde moiety is present in the range of .2 to .6 mole per mole of resorcinol moiety.

3. The process for treating a gelatin printing image on a lithographic printing master to harden and improve the oleophilic properties of said gelatin in the presence of small amounts of silicon dioxide which comprises wetting said gelatin image with an aqueous solution having a pH of about 7 containing a water-soluble condensation product of resorcinol and 2-furaldehyde wherein the 2-furaldehyde moiety is present in the range of .2 to .6 mole per mole of resorcinol moiety, said aqueous solution containing 5% to 60% by weight of said condensation product based on the weight of the resorcinol moiety.

4. An aqueous solution for treating the surface of a lithographic printing master having a gelatin printing image which comprises a water-soluble condensation product prepared by condensing 2-furaldehyde and resorcinol at a ratio of about .4 mole of 2-furaldehyde for each mole of resorcinol in the presence of an alkaline catalyst material and thereafter adding sufficient alkali metal bisulfite to the resulting reaction product to give said aqueous solution a pH of about 7, said aqueous solution containing about 15% by weight of said condensation product based on the resorcinol moiety.

5. An aqueous solution for treating the surface of a lithographic printing master having a gelatin printing image which comprises a water-soluble condensation product prepared by condensing 2-furaldehyde and resorcinol in the presence of an alkaline catalyst material and having .2 to .6 mole of 2-furaldehyde moiety per mole of resorcinol moiety, sufficient alkali metal bisulfite having been added to the said condensation product to give said aqueous solution a pH of about 7, and said aqueous solution containing 5% to 60% by weight of said condensation product based on the resorcinol moiety.

References Cited in the file of this patent

UNITED STATES PATENTS

| | | |
|---|---|---|
| 2,291,673 | Albers et al. | Aug. 4, 1942 |
| 2,394,375 | Gross | Feb. 5, 1946 |